United States Patent [19]
Naylor

[11] 3,900,456
[45] Aug. 19, 1975

[54] POLYISOPRENE

[75] Inventor: Floyd E. Naylor, Bartlesville, Okla.

[73] Assignee: Phillips Petroleum Company, Bartlesville, Okla.

[22] Filed: Jan. 31, 1974

[21] Appl. No.: 438,421

[52] U.S. Cl............................ 260/94.3; 252/429 C
[51] Int. Cl............................... C08d 1/4; C08d 3/2
[58] Field of Search..................... 260/94.3, 94.2 M; 252/429 C

[56] References Cited
UNITED STATES PATENTS

| | | |
|---|---|---|
| 3,067,189 | 12/1962 | Balas.................................. 260/94.3 |
| 3,317,494 | 5/1967 | Farson................................ 260/82.1 |
| 3,361,730 | 1/1968 | Naylor................................ 260/94.3 |
| 3,557,076 | 1/1971 | Bonfardeci et al................ 260/94.3 |
| 3,560,473 | 2/1971 | Bonfardeci et al................ 260/94.3 |
| 3,580,899 | 5/1971 | Massoubre......................... 260/94.3 |
| 3,607,854 | 9/1971 | Antropiusova et al............ 260/94.3 |

*Primary Examiner*—William F. Hamrock

[57] ABSTRACT

Isoprene is polymerized by the use of a catalyst system including a Group IA metal alkyl, an aluminum halogen compound, and a tetravalent titanium salt.

24 Claims, No Drawings

POLYISOPRENE

FIELD OF THE INVENTION

The invention relates to the preparation of polyisoprene.

BACKGROUND OF THE INVENTION

It is known from studies of natural rubber and of synthetic polyisoprenes that a high cis product is much to be preferred. Such polymers are characterized by excellent tack, particularly desirable for tires, for example, with vulcanizates having good resilience, low hysteresis properties, high tensile strength, good low temperature flexibility, and other desirable properties.

While some polymerization methods may be generally effective for polymerizable conjugated dienes, isoprene, perhaps because of its "iso" structure, exhibits peculiarities sufficient to make it unique in many situations. Initiator systems which will polymerize isoprene to produce a polyisoprene exhibiting many of the desirable characteristics of natural rubber are of both technical and commercial interest.

OBJECTS OF THE INVENTION

It is an object of the invention to provide an initiator system to polymerize isoprene to a product with desirable physical characteristics. It is another object to provide a process to produce high cis-polyisoprene.

Other aspects, objects, and advantages of the present invention will become apparent from a study of the disclosure and my appended claims.

BRIEF SUMMARY OF THE INVENTION

I have discovered a novel process to polymerize isoprene. My process can polymerize isoprene to a high cis product. My process employs a catalyst system comprising a hydrocarbyl metal of Group IA, an aluminum halogen compound which can be an aluminum trihalide or organoaluminum halide, and a tetravalent titanium salt. The similarities of my high cis-polyisoprene to natural rubbers in properties and utilities represent a distinct achievement.

INITIATOR SYSTEM

Hydrocarbyl Compound of Group IA Metal

The first component (I) of my catalyst system is a hydrocarbyl compound of a Group IA metal of the periodic table, such as n-butyllithium. The metal of the first component can be lithium, sodium, potassium, rubidium, or cesium, presently preferred being lithium for reactivity. The hydrocarbyl radical can range widely in size and type. The hydrocarbyl component can be alkyl, cycloalkyl, aryl, or combination thereof such as aralkyl, alkaryl, and the like. Presently I prefer for reactivity a carbon atom range of 1 to 20 carbon atoms. These initiators can include the multifunctional initiators, some of which can be represented by $RM_x$ wherein R is the hydrocarbyl group, M the Group IA metal, and $x$ is an integer of 1 to 4.

Typical examples of R radicals include methyl, ethyl, n-propyl, isopropyl, t-butyl, n-hexyl, dodecyl, tridodecyl, eicosyl, cyclopentyl, cyclohexyl, methylcyclohexyl, benzyl, phenyl, 4-tolyl, 2,4,6-trimethylphenyl, 4-t-butylphenyl, and the like. Specific examples of compounds include n-butyllithium, methylsodium, isobutylpotassium, 1,4-dilithiobutane, isooctylrubidium, n-dodecylcesium, isooctadecyllithium, n-eicosylsodium, cyclopentylpotassium, phenylrubidium, 1,3,5-trilithiobenzene, 4-tolylcesium, tetralithionaphthalene, and the like. Of course, mixtures can be employed.

Aluminum Compounds

The (II) component aluminum halides include organoaluminum halides as well as the aluminum trihalides. Thus, the term "aluminum halides" is intended by me to be a generic term including both the inorganic aluminum halides and the organoaluminum halides including mono-, di-, tri-, and the sesquihalides.

The halogen of the aluminum halides can be chloride, bromide, or iodide. Presently preferred are the chloride or bromide as lower in cost. Where an organoaluminum halide is to be employed, the organo radical is a hydrocarbyl radical, and can be alkyl, cycloalkyl, aryl, or combination thereof. The organo radical for preferred reactivity preferably is of a range of 1 to 20 carbon atoms. The aluminum halides can be represented by $R_aAlX_b$, in which R represents the hydrocarbyl radical, X is the halogen, $a$ is zero or an integer of 1 or 2, and $b$ is an integer of 1 to 3, inclusive, such that $a + b$ equals 3. The organoaluminum sesquihalides, sometimes described as equimolar mixtures of organoaluminum monohalides with organoaluminum dihalides, can be represented by $R_3Al_2X_3$.

Typical examples of aluminum compounds include aluminum trichloride, aluminum tribromide, aluminum triiodide, and various monohydrocarbyl- or dihydrocarbyl aluminum halides such as methylaluminum dichloride, dimethylaluminum bromide, diethylaluminum chloride, n-butylaluminum dichloride, ethylaluminum dibromide, diisobutylaluminum chloride, decylaluminum dibromide, eicosylaluminum dichloride, n-butylethylaluminum chloride, dicyclopentylaluminum bromide, cyclohexylaluminum dibromide, phenylaluminum dibromide, 3-propylphenylaluminum dichloride, 3-pentylbutylaluminum dibromide, methylaluminum sesquichloride, and the like, or mixtures.

Tetravalent Titanium Salt

The third component (III) of my catalyst system is a tetravalent titanium salt, e.g., titanium tetrahalide. The titanium salt can be any of the chloride, bromide, iodide, or the alkoxylic —OR in which R is as described above, though preferably of up to 8 carbon atoms for availability and practicality. The iodide tends to lower molecular weight of the polymers and hence is not preferred. The titanium salts can be represented by $TiX'_4$, in which X' represents any of the groups just mentioned. In any specific compound the X' groups can be the same or different.

Typical examples of these tetravalent titanium salts include such as titanium tetrachloride, titanium tetrabromide, titanium tetraiodide, tetramethyl titanate, tetraethyl titanate, tetraisopropyl titanate, tetra-n-butyl titanate, tetra-secbutyl titanate, tetra-2-ethylhexyl titanate, tetra-o-tolyl titanate, tetraphenyl titanate, tetrabenzyl titanate, tetra-2-phenylethyl titanate, tetracyclohexyl titanate, dimethyl titanium dichloride, and the like, including mixtures.

Initiator Component Ratios

The relative ratios of my catalyst components one to the other, the (I) hydrocarbyl Group IA component, the (II) aluminum halide, and the (III) tetravalent titanium salt, can vary widely. Presently, for most polymerizations, from my experience, I suggest a mole ratio range of (I):(II):(III) of about 6–0.2:6–0.2:1, prefer for reactivity a range of 3–0.5:3–0.5:1, and consider as optimum for reactivity a ratio of the order of 1:1:1.

The catalyst components can be added to each other or mixed one with the other in any order or altogether as may be convenient. However, it is presently preferred to allow the mixed catalyst system to stand for a time prior to the addition thereto of the monomer. Whether this standing in contact results in a combination or reaction of one with the other to produce a combined type of some type, is not the question. The standing for a short time is called aging and does tend to provide a better performing catalyst composition resulting in improved conversions and reduced proportions of lower molecular weight polymer being produced such as might otherwise confer a stickiness to the ultimate product. This standing or aging interval can advantageously range from a few minutes such as about 30 minutes to upwards of 1 or 2 days, and must be under an inert atmosphere, e.g., nitrogen, to avoid loss of catalyst activity.

Polymerization Process

My process of polymerization of isoprene can be conducted at a relatively wide range of temperature, pressure, time, and presence of solvent or diluent. For preparation of high cis products, particular attention to the polymerization temperatures should be paid. To obtain a cis content of approximately 90 percent, it presently is preferred to carry out the polymerization within the range of approximately 40° to 70° C. To obtain a cis content of approximately 98 percent or higher, it presently is preferred to carry out the polymerization within a range of about −30° to 25° C. Thus, in the range of 25° to 40° C., a variation as desired of the cis content can be obtained. Operable temperature ranges, of course, depend to some extent upon concentration of monomer, particular catalyst system chosen from the defined groups I have discussed, and other factors, such that the broad polymerization temperature can be within a range of such as about −30° or less to 100° C. or more, to obtain polymerization of isoprene to what may be termed moderately high cis as well as very high cis products.

The polymerization process is feasible without diluent, though conveniently and preferably is carried out in the presence of a diluent to obtain high cis products. Diluents include hydrocarbons not otherwise detrimental to the polymerization process including paraffinic, cycloparaffinic, aromatic, and combination types, as well as mixtures, if desired. Suitable diluents can vary widely in the number of carbon atoms per compound, depending on the polymerization pressure, temperature, and other factors. Presently preferred to obtain desirably high values for cis and mole weight are hydrocarbon diluents containing up to 10 carbon atoms per molecule, with the paraffinic hydrocarbons presently more preferred for similar reasons. Examples include the n-hexane and n-heptane used in my examples, and also include propane, n-butane, n-pentane, isopentane, isohexane, 2,2,4-trimethylpentane, n-decane, cyclohexane, methylcyclohexane, benzene, toluene, xylene, ethylbenzene, and the like, alone, or in admixture. Diluents can be employed over wide concentration ranges, in my experience, such as up to 1,000 phm (parts by weight per 100 parts of monomer) or more, down to very minor amounts of diluent, such as in the range 50 to 1,000 phm, presently preferably about 150 to 400 phm.

An oligomerization inhibitor, while not required, presently preferably is employed in the process. Aryl ethers or carbon disulfide are known to be satisfactory for this purpose. Of the aryl ethers, typical are diphenyl ether, dinaphthyl ether, methylphenyl ether, and similar types including the substituted aryl ethers, preferably for desired results with up to 24 carbon atoms per compound for convenient solubility. Aryl ethers or carbon disulfide are known to be suitable for this purpose, though, for reasons unknown to me, the alkyl ethers are unsatisfactory. Where the aryl ethers are employed, I suggest a broad range of up to 20 mhm, preferring for reactivity on the order of about 2 to 6 mhm. Where carbon disulfide is employed, I suggest up to about 1 mhm, and prefer for reactivity about 0.05 to 0.25 mhm. Carbon disulfide is less preferred than the aryl ethers, because of the tendency of carbon disulfide to retard polymerization somewhat, though it is more effective on a weight basis. The optional inhibitor can be added at any time after adding the titanium salt, including after addition of monomer.

The polymerization process can be carried out under autogenous pressure or any suitable pressure sufficient to maintain the reaction mixture preferably substantially in the liquid phase. Pressures employed thus depend on the diluent employed, temperatures at which the polymerization is carried out, and the like. Higher pressures, of course, can be employed if desired, including employment of an inert gas, e.g., nitrogen.

Polymerization times can vary considerably dependent on such factors as molecular weight of product desired, quantity of catalyst employed, the cis content desired, and hence the polymerization temperature, and the like. Exemplary times range from a few minutes to many hours, such as 48 hours, although longer polymerization intervals can be employed, if desired. The process can be operated as a batch process, or as a continuous process with intermittent or continuous input of reactants and withdrawal of product.

Various substances may be detrimental to the catalyst composition in the polymerization process, such as carbon dioxide, molecular oxygen, water, alcohols, and the like. It is preferable, therefore, that the isoprene be freed of any such materials as well as any other material which may tend to inactivate or reduce effectiveness of the catalyst. Any means known for treating isoprene, and diluent if necessary, for removal of such contaminants can be employed including distillation, treatment with molecular sieves, and the like. Of course, the reaction zone should be freed of air, moisture, and the like, prior to adding the polymerization reaction components. It is recognized that minor amounts of catalyst inactivating materials can be tolerated in the reaction mixture, simply compensating by the amount of catalyst employed.

At the completion of the polymerization reaction, the resulting mixture can be treated to inactivate the catalyst, using a catalyst inactivating agent, such as water, or lower alcohol. If desired, a small amount of the catalyst inactivating material can be added sufficient to inactivate the catalyst yet without causing precipitation of the polymer itself. In general, it is desirable or advantageous to add a small amount of an antioxidant or stabilizer to the polymer solution prior to precipitation of the polymer, to avoid undesirable oxidation of the polymer during handling and recovery. The polymer present can be separated by the addition of an excess of an agent such as ethyl alcohol or isopropyl alcohol. Any means suitable for recovery of the rubber can be employed. The polymer can be separated by decantation, or filtration, or the like. After separation, the polymer is normally dried by the usual means.

EXAMPLES

Particular materials employed are intended to be illustrative, not limitative, of the reasonable and proper scope of my invention.

EXAMPLE I

In these runs, the diluent was charged to the reactor, the reactor then purged of air by the use of nitrogen, the catalyst components added with the titanium salt added last, diphenyl ether added, and the mixture then allowed to stand or age prior to addition of the monomer. Upon completion of polymerization, an antioxidant was added (2,6-di-t-butyl-4-methylphenol in a 50/50 toluene/isopropyl alcohol solution) in an amount of approximately 1 phr, parts by weight per 100 parts of rubber. The rubbery polymer was precipitated by addition of isopropyl alcohol, filtered, washed, dried, and evaluated.

Data obtained is shown in the following table:

As can be observed from the table above and the evaluation data obtained, all products had a desirably high cis value. The gum tensile strength of the polymer of Run 1 was determined and found to be 4,570 psi as contrasted to only 4,100 psi for a natural rubber used as a control sample (30 minutes cure at 293° F. using ASTM Method D 412-62T).

Runs both with and without an aryl ether are shown above, and a suitably high cis product can be made with or without the oligomerization inhibitor. The run without the inhibitor did show a relatively high gel.

EXAMPLE II

In runs of this example, the diluent was charged, the reactor purged of air with nitrogen, diphenyl ether added, and the catalyst then added as a preformed composition. The preformed catalyst composition was made by addition in order of the lithium compound, the aluminum compound, the titanium compound, and allowing the admixed components to age prior to charging to the reactor. Monomer was added to the reactor last, following the addition of the aged catalyst composition. Otherwise, the rubbery polymers were prepared and recovered as described in Example I above. Results are shown in Table II:

TABLE I

Polymerizations with Catalysts Formed in Situ
Catalyst Components

| Run No. | Diluent n-Hexane phm | A Compound | mhm[a] | B Compound | mhm | C Compound | mhm |
|---|---|---|---|---|---|---|---|
| 1 | 300[a] | n-BuLi | 2.2 | AlBr$_3$ | 0.8 | TiCl$_4$ | 1.2 |
| 2 | 300[a] | n-BuLi | 2.2 | AlBr$_3$ | 0.8 | TiCl$_4$ | 0.9 |
| 3 | 400[a] | n-BuLi | 1 | Et$_2$AlCl | 1 | TiCl$_4$ | 1.14 |
| 4 | 400[b] | n-BuLi | 1.8 | EtAlCl$_2$ | 1 | TiCl$_4$ | 1 |

| Run No. | Diphenyl Ether mhm | Catalyst Aging Time Hrs | °C | Hrs | Conversion wt. % | % Cis-1,4-[d] | 3,4 % | Inherent Viscosity[e] | Gel[g] % |
|---|---|---|---|---|---|---|---|---|---|
| 1 | 1.8 | 1 | 50 | 16 | 25 | 89 | 3.2 | 3.56 | — |
| 2 | 1.8 | 1.5 | 50 | 19 | 20 | 88 | 3.0 | 3.74 | 0 |
| 3 | 1.05 | 0.5 | 50 | 18 | 32 | 88 | 2.1 | —[f] | — |
| 4 | 0 | 0.5 | 50 | 21 | 27 | 83 | 2.5 | 3.48 | 33 |

[a] n-Hexane.
[b] n-Heptane.
[c] Gram millimoles per 100 grams monomer.
[d] Determination of cis-1,4- content and of 3,4- content were made by infrared absorption spectroscopy.
[e] Inherent viscosity was determined in accordance with U.S. 3,278,508, column 20, note a.
[f] The — indicates not determined.
[g] Gel content determination in accordance with U.S. 3,278,508, column 20, note b.

TABLE II

Polymerizations with Preformed Catalysts
Catalyst Components

| Run No | Diluent n-Hexane phm | A Compound | mhm | B Compound | mhm | C Compound | mhm |
|---|---|---|---|---|---|---|---|
| 5 | 300 | n-BuLi | 3 | iso-Bu$_2$AlCl | 3 | TiCl$_4$ | 3 |
| 6 | 500 | n-BuLi | 3 | iso-Bu$_2$AlCl | 3 | TiCl$_4$ | 3 |
| 7 | 400 | n-BuLi | 3 | iso-Bu$_2$AlCl | 3 | TiCl$_4$ | 3 |
| 8 | 500 | n-BuLi | 3 | iso-Bu$_2$AlCl | 3 | TiCl$_4$ | 3 |
| 9 | 400 | n-BuLi | 1.5 | iso-Bu$_2$AlCl | 1.5 | TiCl$_4$ | 1.5 |

| Run No. | Diphenyl Ether mhm | Catalyst Aging Time Hrs. | °C | Hrs. | Conversion wt. % | % Cis-1,4- | 3,4 % | Inherent Viscosity | Gel % |
|---|---|---|---|---|---|---|---|---|---|
| 5 | 4.5 | 1 | 5 | 3 | 48 | 102[h] | 1.7 | 4.09 | 2 |
| 6 | 4.5 | 1 | 5 | 18 | 30 | 102[h] | 2.2 | 3.68 | 54 |
| 7 | 4.5 | 0.5 | 5 | 6 | 28 | 100 | 2.1 | 3.56 | 7 |
| 8 | 4.5 | 1 | 5 | 18 | 37 | 97 | 2.3 | 2.44 | 4 |
| 9 | 2.25 | 0.5 | 25 | 6 | 24 | 96 | 2.3 | 4.82 | 35 |

[h] Observed value, possibly as much as 5% too high.

All the polymers prepared in this example were notable for their outstandingly high cis-1,4-content. The polymerization temperatures for this series of runs were relatively low, of the order of 5° C. in Runs 5, 6, 7, and 8. However, Run 9 was run at 25° C., and the cis content was very close to that of the others, 96 percent cis-1,4-, indicating that high cis-polyisoprene can be prepared using this catalyst even up to 25° C. polymerization temperature.

Polymers produced in accordance with my invention are rubbery. My process can produce high cis polymers as demonstrated. The polymers so prepared can be, in my opinion, compounded by various methods as known to those skilled in the art for the compounding of natural and synthetic rubbers. Vulcanization accelerators, vulcanizing agents, reinforcing agents, and fillers, such as have been employed in natural rubber can be used. The polymers can be blended with other polymers, such as with natural rubber, or with various synthetic rubbers for specialty purposes. Polymers produced in accordance with my invention which have a high cis-1,4-content are particularly suitable, I believe, for applications requiring low hysteresis, high resiliency, low freeze point, and/or ease of milling. These polymers are expected to have utility in applications where natural and synthetic rubbers are utilized, but particularly in the manufacture of automobile and truck tires, and other rubbery articles such as gaskets.

The disclosure, including data, illustrate the value and effectiveness of my invention. The examples, the knowledge and background of the field of the invention and general principles of chemistry and other applicable sciences, have formed the bases from which the broad descriptions of the invention, including the ranges, conditions, and generic groups of operant components, have been developed, which have formed the bases for my claims here appended.

I claim:

1. A process which comprises polymerizing isoprene under polymerization conditions including effective polymerization temperature, pressure, and time, to form a high cis rubbery polymer having a cis 1,4 content of at least about 83 percent wherein the improvement comprises polymerization in the presence of an effective amount of the catalyst which forms on admixing components consisting essentially of effective catalytic ratios of (I) a hydrocarbon compound of a metal of Group IA of the periodic table, (II) an aluminum halide, and (III) a tetravalent titanium salt represented by $TiY_4$ wherein Y is chlorine, bromine, iodine, or alkoxylic —OR, wherein R is a hydrocarbon radical containing up to 8 carbon atoms per R group.

2. The process according to claim 1 wherein said (I) hydrocarbyl Group IA compound the hydrocarbyl is alkyl, cycloalkyl, aryl, or combination thereof such as alkaryl or aralkyl, and said Group IA metal is lithium, sodium, potassium, rubidium, or cesium.

3. The process according to claim 2 wherein said (I) hydrocarbyl group contains up to 20 carbon atoms and said hydrocarbyl compound of the metal of Group IA is represented by $RM_x$ wherein R is said hydrocarbyl, M is said metal of Group IA, and $x$ is an integer of 1 to 4, inclusive.

4. The process according to claim 3 wherein said hydrocarbyl compound of a metal of Group IA is a n-butyllithium, ethyl sodium, isobutyl potassium, 1,4-dilithiobutane, isooctyl rubidium, n-dodecyl cesium, isooctadecyllithium, n-eicosyl sodium, cyclopentyl potassium, phenyl rubidium, 1,3,5-trilithiobenzene, 4-tolyl cesium, or tetralithionaphthalene.

5. The process according to claim 1 wherein said (II) aluminum halide is an organoaluminum halide or aluminum trihalide, and where organo is a hydrocarbyl aluminum halide wherein said hydrocarbyl is alkyl, cycloalkyl, aryl, or combination, and said halide is chloride, bromide, or iodide.

6. The process according to claim 5 wherein said aluminum halide is represented by $R_aAlX_b$ or $R_3Al_2X_3$ wherein R is said hydrocarbyl radical and contains up to 20 carbon atoms, X is halogen, $a$ is an integer and is zero, 1 or 2, $b$ is an integer and is 1, 2, or 3, such that $a + b = 3$.

7. The process according to claim 6 wherein said (II) is methylaluminum dichloride, dimethylaluminum bromide, diethylaluminum chloride, aluminum chloride, n-butylaluminum dichloride, ethylaluminum dibromide, diisobutylaluminum chloride, decylaluminum dibromide, eicosylaluminum dichloride, n-butylethylaluminum chloride, dicyclopentylaluminum bromide, cyclohexylaluminum dibromide, phenylaluminum dibromide, 3-propylphenyl-aluminum dichloride, and 3-pentylbutylaluminum dibromide.

8. The process according to claim 1 wherein said (III) is titanium tetrafluoride, titanium tetrachloride, titanium tetrabromide, tetramethyl titanate, tetraethyl titanate, tetraisopropyl titanate, tetra-n-butyl titanate, tetra-sec-butyl titanate, tetra-2-ethylhexyl titanate, tetra-o-tolyl titanate, tetraphenyl titanate, tetrabenzyl titanate, tetra-2-phenylethyl titanate, tetracyclohexyl titanate, and dimethyl titanium dichloride.

9. The process according to claim 1 wherein said catalyst composition employs a ratio of said (I):(II):(III) in the range of 0.1–1.5(I):0.5–2(II):1(III).

10. The process according to claim 9 employing a ratio of (I):(II):(III) of 0.5–1(I):0.8–1.2(II):1(III).

11. The process according to claim 10 employing a ratio of (I):(II):(III) of about 1:1:1.

12. The process according to claim 1 further comprising the step of aging said catalyst composition prior to contacting with said isoprene.

13. The process according to claim 9 further employing a polymerization diluent which is a paraffinic, cycloparaffinic, aromatic hydrocarbon, or mixture, of up to 10 carbon atoms per molecule, and wherein said diluent is employed in a concentration of about 50 to 1000 phm.

14. The process according to claim 13 wherein said diluent is propane, n-butane, n-pentane, isopentane, n-hexane, isohexane, 2,2,4-trimethylpentane, n-decane, cyclohexane, methylcyclohexane, benzene, toluene, xylene, ethylbenzene, or mixture.

15. The process according to claim 9 wherein said polymerization process is conducted at a temperature in the range of about −30° to 100° C.

16. The process according to claim 15 wherein said polymerization is conducted at a temperature in the range of about +40° to +70° C.

17. The process according to claim 15 wherein said polymerization process is conducted at a temperature in the range of about −30° to +25° C.

18. The process according to claim 15 wherein said (I) is n-butyllithium, said (II) is aluminum tribromide, and (III) is titanium tetrachloride.

19. The process according to claim 15 wherein said (I) is n-butyllithium, said (II) is diethylaluminum chloride, and (III) is titanium tetrachloride.

20. The process according to claim 15 wherein said (I) is n-butyllithium, said (II) is diisobutylaluminum monochloride, and (III) is titanium tetrachloride.

21. The process according to claim 15 wherein said (I) is n-butyllithium, said (II) is diethylaluminum chloride, and (III) is titanium tetrachloride.

22. The process according to claim 15 wherein said (I) is n-butyllithium, said (II) is isobutylaluminum dichloride, and (III) is titanium tetrachloride.

23. The process according to claim 13 wherein further is employed in said polymerization process an oligomerization inhibitor which is an aryl ether to the extent of up to 20 mhm, or carbon disulfide to the extent of up to 1 mhm, wherein said inhibitor is added to said polymerization process system after addition of said titanium salt.

24. The process according to claim 23 wherein said inhibitor is said aryl ether, and is diphenyl ether, dinaphthyl ether, or methylphenyl ether.

* * * * *